Feb. 19, 1929.
A. W. COCHRAN
1,702,812
ROUTER BIT
Filed July 13, 1925
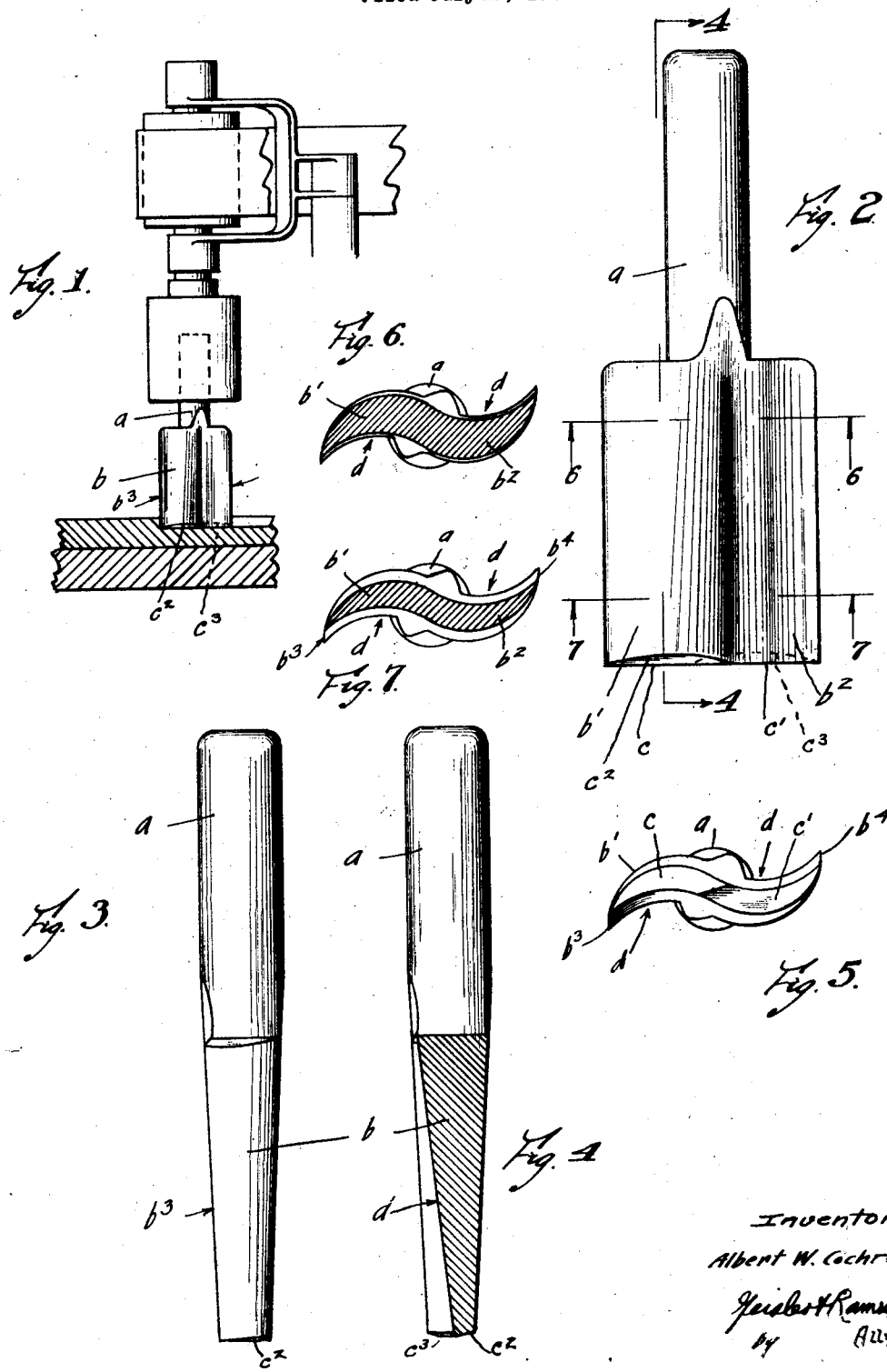
Inventor:
Albert W. Cochran
by Herbert Ramsey
Attys Patented Feb. 19, 1929.

1,702,812

UNITED STATES PATENT OFFICE.

ALBERT W. COCHRAN, OF PORTLAND, OREGON.

ROUTER BIT.

Application filed July 13, 1925. Serial No. 43,284.

My invention relates to router bits of the type used to remove non-printing surfaces of stereotype plates and the like.

Heretofore, a single bladed router-bit was generally used, the single blade being carried off-center on the shank. A single-bladed router bit has this disadvantage: It imposes a relatively large off-center load upon the shank, and thus imposes a relatively great twisting strain, which requires that the shank and the blade be made extra thick so as to stand such strain. Said single construction also tends to limit the speed at which the router bit can be fed into the work.

The object of my invention is to provide a router-bit not subject to said draw-backs. To this end my improved router-bit is provided with two blades, of substantially equal size and shape and arranged diametrically opposite each other on opposite sides of the center line of the shank. The blades arranged in this manner, cut equally on both sides of the center line, thus producing no off-center load thereon.

A further object of my invention is to provide a router-bit with a relatively thin blade so as to permit it to enter the work more easily. I attain this object by making the blades of progressively decreasing thickness from the portion adjacent the shank, to the cutting edge at the extremity of said blade. That is, the cutting edge is the thinnest portion of the blade and it is progressively thicker towards the shank portion. This permits the cutting edge to be relatively thin and the portion adjacent the shank to be strong enough to resist the stresses imposed thereon when said cutting blade is removing metal from a plate, or the like.

A further object of my invention is to provide a router-bit of this character which clears the metal away from the recess in which it is working so that the chips will never pack tight about the bit to tend to jamb the blade when operating. This object is attained by shaping the cutting end or face of the bit relatively to the direction of the rotation, so that it is inclined away from the cutting edge.

In other words, said cutting end, or face, is tapered exteriorly to a line intersecting the longitudinal axis of the bit. Hence the interior recessed faces of said blades make an acute angle with the surface upon which my router-bit is used, and tend to impinge the chips cut away from said surface against the latter, thus to cause them to rebound therefrom and to keep said surface clear of said chips.

In this connection it is to be noted that the principle of operation of my router-bit may be said to be directly opposed to the principle employed in clearing the chips from a wood cutting tool, or the like; for in the latter tool the cutting end is shaped so as to be inclined to make an obtuse angle relatively therewith and thus the chips or shavings are gouged off and thrown up the inclined surface and thus out of the cut.

Full details of construction of my router bit are hereinafter described with reference to the accompanying drawings.

In the drawings:

Fig. 1 is a diagrammatic view of my improved router-bit mounted in a rotating head and routing a flat plate;

Fig. 2 is a larger scaled elevation of my improved double-bladed router bit;

Fig. 3 is a similar scaled edge elevation thereof;

Fig. 4 is a longitudinal section taken along the line 4—4 of Fig. 2;

Fig. 5 is an end elevation of said router-bit;

Fig. 6 is a cross section taken through the blade on the line 6—6 of Fig. 2; and Fig. 7 is a similar cross section taken on the line 7—7 of Fig. 2.

My improved router-bit comprises a shank $a$ and a blade element $b$ consisting of two cutting blades $b'$ and $b^2$ having cutting edges $c$ and $c'$ at their extremities away from the shank. Each of said blades are fluted, as shown in Figs. 5, 6 and 7, so that the side edges $b^3$ and $b^4$ are slightly in advance of the remainder. The cutting edges $c$ and $c'$ are substantially flat, except that portions $c^2$ and $c^3$ are "backed off" to permit the blades to clear the shavings or chips cut thereby, this feature being common in all router blades. The blades are virtually continuations of each other, being oppositely curved however, and are substantially of uniform thickness across their entire cutting surfaces. Said blades, however, increase progressively in thickness towards the shank, as shown in Figs. 3 and 4, and thus the forward or concaved face $d$ of each of said blades makes an acute angle relatively to the work being routed. As has been brought out heretofore, the chips routed out of said plates are thrown downwardly, due to the inclination of said forward face and due to the tremendous speed to which said router-bits rotate strike with great velocity from the cut thus made and rebound away from the plate. Using a router-bit of this character requires that the operator stand behind some transparent surface but permits him to operate at great speed, for the reason that the chips never tend to clog the work. By making the blade relatively thin and substantially flat, I am thus able to provide a cutting edge across the entire width of both blades. Heretofore, it was common to extend the shank the entire length of the blade to obtain the necessary strength and to arrange the blade to extend sidewise therefrom. The shank is relatively thick and thus to provide sufficient clearance away from said cutting edge was "backed off" at a substantial angle and all of the cutting was done with the point of said blade. This caused the point to wear away quickly and necessitated the router being sharpened frequently. By making said blade relatively thin and substantially of uniform thickness and with the cutting edge extending entirely across both blades, the blade not only may be fed into the work much more readily, but also requires less regrinding, and being tapered, may be fed vertically into the work much more easily.

I claim:

A router bit comprising a shank and a cutting head formed of two oppositely curved blades projecting laterally in opposite directions beyond the plane of the shank, the inner and outer curved faces of the blades throughout that length beyond the plane of the shank converging toward their lateral cutting edges, the incurved face of each blade being inclined upwardly and outwardly from the lower cutting edge of the blade, whereby to provide a surface forming an acute angle with the surface of the work to thereby cause the particles cut from the work to be directed downwardly by such inclined surface at an angle to and in a direction toward the surface being operated upon.

ALBERT W. COCHRAN.